Aug. 12, 1958   J. WADDELL ET AL   2,847,041
DISPENSING APPARATUS FOR LIQUIDS
Filed March 19, 1956   3 Sheets-Sheet 1

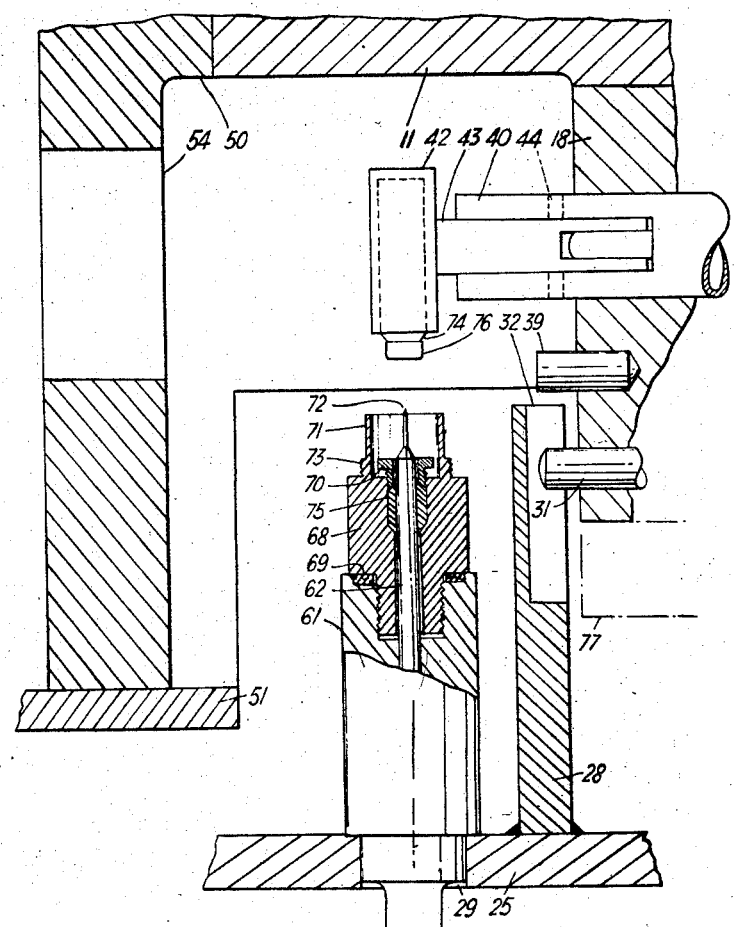
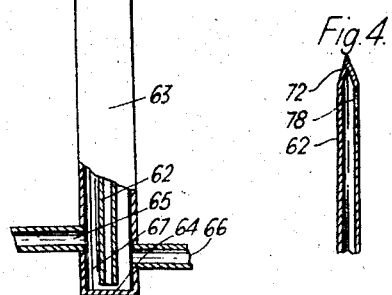

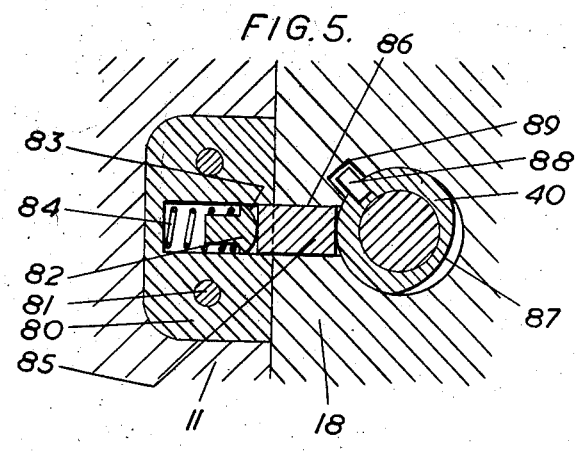
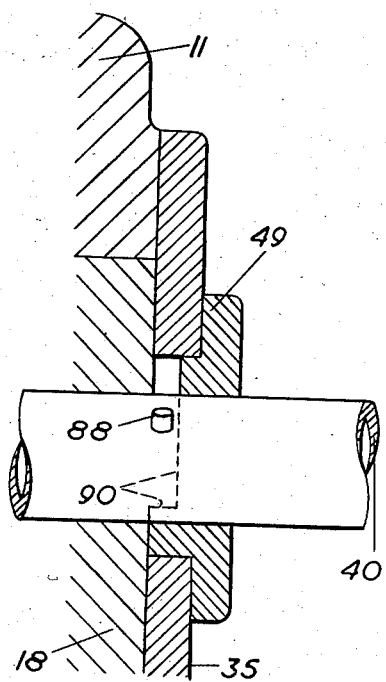

United States Patent Office 2,847,041
Patented Aug. 12, 1958

2,847,041

DISPENSING APPARATUS FOR LIQUIDS

John Waddell and Horace Frank Parker, Warrington, England, assignors to United Kingdom Atomic Energy Authority, London, England Application March 19, 1956, Serial No. 572,391

4 Claims. (Cl. 141—91)

This invention relates to dispensing apparatus for liquids and it has a principal application to the dispensing of radio-active liquors for sampling purposes.

The problem of sampling radioactive liquors is one of minimising radiation from the sampling points and of avoiding spilling of the liquors which would cause contamination. The present invention provides simple apparatus in solution of this problem.

According to the invention, dispensing apparatus for liquids comprises a small capacity reservoir for the liquids, means for flushing liquids through the reservoir and thereafter filling it to a predetermined level, a hypodermic-type needle having its unpointed end open to the reservoir below said predetermined level and its pointed end exposed above said level and means for advancing and withdrawing a rubber-capped evacuated bottle of greater capacity than the volume of the liquid in the reservoir on to and away from the needle so that the needle penetrates the cap and injects fluid from the reservoir into the bottle.

A sampling apparatus for radioactive liquors will now be described with reference to the drawings.

Fig. 3 is an enlarged view of the part of Fig. 2 embraced by the line III—III.

Fig. 4 is a sectional view of a hollow needle.

Figs. 5 and 6 are sectional views of modified parts of the apparatus.

Figure 1:
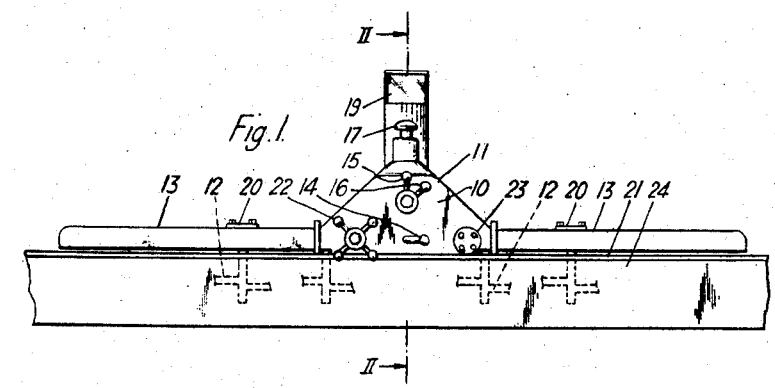
Fig. 1 is an elevation.

In Fig. 1 a sampling machine 10 is shown having a body part 11 transversable over a row of fluid sampling points 12. Extension shielding parts 13, are provided on the sides of the body part 11. The machine is located by means of a handle 14 and associated mechanism (described more fully with reference to Fig. 2). Sampling bottle holding tongs are provided on the axis of handles 15 and 16 and a plunger 17 is provided for moving a slide block 18 (Fig. 2) within the body part 11. Operations can be viewed through a periscope 19 and access to the sampling points, such as for the replacement of needles, is provided by covers 20. The machine moves on rails 21 by rotation of a handle 22. A wheel cover 23 is shown and a shielding wall 24.

Figure 2:
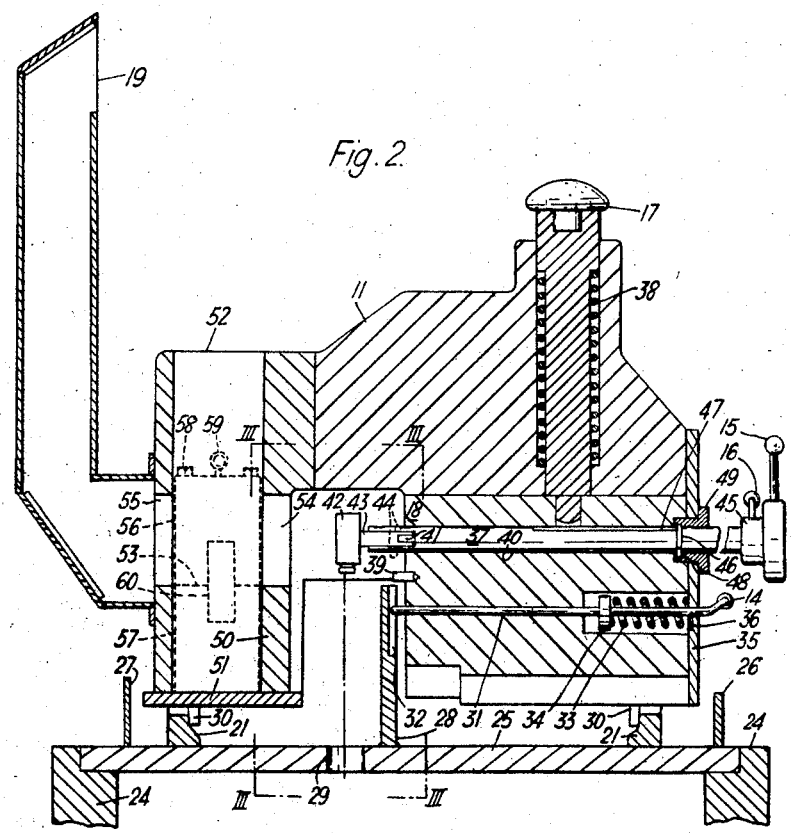
Fig. 2 is an enlarged sectional view on the line II—II of Fig. 1.

In Fig. 2 a base plate 25 is supported between walls 24. The base plate carries rails 21, a front plate 26 and a rear plate 27 to contain any unforeseen spillages, and a locating plate 28. Holes 29 are provided to accommodate needle sampling apparatus as described more fully with reference to Fig. 3. The machine 10 has wheels 30 running on the rails 21 and it is located for sampling by a rod 31 engaging a vertical groove 32 in the plate 28. The rod 31 is spring-loaded by a spring 33 between a collar 34 aand plate 35. The rod can be locked in a disengaged position by a pin 36 engaging a groove. Movement of the handle 14 effects engagement and disengagement.

The body 11 of the machine has a slide block 18. The block 18 carries the locating rod 31, a tong assembly 37 and the plate 35. The slide block is moved by the plunger 17 which is loaded by a spring 38. A pin 39, fitted in the slide block 18 at a height just above the plate 28 prevents the slide block being depressed unless the locating rod 31 is inserted in a groove 32 when the pin can then also move into the groove 32. The tong mechanism 37 consists of two main parts, the one part is an outer sleeve 40, which is coupled with the handle 15 and the other part is a rod 41 inside the sleeve 40 and coupled at one end with tong jaws 42 and at the other end with the handle 16. The jaws 42 are mounted on arms 43 pivoted on a pin 44 in the sleeve 40. The rod 41 slides in one direction to open the jaws and in the other direction to close the jaws. A bayonet groove is provided in the boss 45 associated with the sleeve 40 to control the movement of handle 16, rod 41 and jaws 42. The sleeve 40 has a semicircular circumferential groove 46 and a longitudinal groove 47 which function in conjunction with a spring-loaded pin 48 supported in a removable boss 49. The grooves 46, 47 provide that the tongs can be moved longitudinally and inverted whilst in the position shown in the drawing, these movements being controlled by the handle 15.

The body 11 is provided with a rear container 50 which has a bottom plate 51, and an open top 52 and a periscope 19. Apertures 54, 55 are provided in the container 50 so that the tongs 37 can be moved longitudinally into the container and so that the process can be viewed by the periscope. A shielded box 53 is shown dotted in the container 50. This box, which is made of lead, consists of an upper part 56 and a lower part 57 held together by bolts 58 and provided with a lifting eye 59. The box is shaped internally to provide a cavity 60 into which a sampling bottle may be fitted.

In Fig. 3 the hole 29 in the base plate 25 is shown equipped wtih needle sampling apparatus. This apparatus consists of a boss 61 drilled to accommodate a hypodermic needle 62. The lower part of the boss 61 is welded to a tube 63 having a closed end 64, an inlet pipe 65 and an outlet pipe 66 so as to form a reservoir or sump 67 of about 2 cc. capacity. The needle 62 dips nearly to the bottom of the sump 67. The upper part of the boss 61 carries a needle housing 68 sealed by a washer 69. In the housing 68 there is a gland packing 75 clamped by a gland nut 70. A skirt 71 is provided round the point 72 of the needle and this skirt has an external thread 73. A bottle 74 having a rubber cap 76 is shown held in the jaws 42. The slide block 18 is shown in its uppermost position and the extent of its downward movement is shown by the dotted corner 77.

In Fig. 4 the preferred form of needle 62 is shown in section. This needle has a closed point 72 and a side hole 78.

The operation will now be described with reference to Figs. 1–4.

The machine is first located at the required sampling point as detected by the rod 31 locating in the appropriate groove 32. The handle 15 is operated to take the tongs through the aperture 54 and into the container 50. The tongs are opened by the handle 16 and an evacuated bottle 74 inserted with the rubber cap uppermost. This operation is carried out with a long pair of curved tongs and mirror viewing. The jaws 42 are closed about the bottle and the handle 15 is operated to bring the bottle over the needle point 72 and the handle is then rotated to invert the bottle. The lower part 57 of the box 53 is placed in position and the upper part 56 is held in a position to block the opening 52. A vacuum lift is operated to flush about 300 cc. of liquid from pipe 65 to 66 via the sump 67. When this flush is completed the bottle (capacity 5 cc. is pressed on to the needle by depressing the plunger 17. After a period of ten seconds the plunger 17 is released and the handle 15 operated to re-invert the bottle and feed it through the aperture 54 and over the cavity 60 in the box 53. The jaws are opened by operating the handle 16 and the bottle falls into the box. The tongs are retracted, the top part of the box lowered on to the bottom part, the bolts 58 screwed into position and the box lifted away by the eye 59. The machine is then moved to the next sampling point and the process repeated.

As the sampling bottle 74 has a capacity in excess of that of the sump 67 and as the needle reaches nearly to the bottom of the sump then the sump is emptied at each sampling operation and radiation during non-sampling periods is kept to a minimum. In addition, by virtue of the excess volume in the bottle, both the sump 67 and needle 62 are flushed with air once the sump has been drained so that a drip free sample is obtained and external contamination is avoided.

For the renewal of a needle the machine is located at two sampling points away from that at which the needle is to be changed. The cover 20 is then removed and with remote manipulating tools an extractor is screwed on to the thread 73 of the sleeve 71 and a spanner lowered to engage the gland nut 70. Spanner and extractor are rotated together until the needle housing 68 together with gland and needle are free of the boss 61 when they can be withdrawn into a shielded box and a new needle and gland nut inserted.

The modification shown in Figs. 5 and 6 will now be described.

Fig. 5 shows a modification introduced to ensure that the block 18 cannot be depressed unless the tong mechanism 37 is in the "inverted" position i. e. in the position shown in Fig. 2 with the bottle 74 inverted in readiness to be punctured by the needle 62.

The body part 11 is provided with an insert piece 80 held by screws 81. The piece 80 carries a plunger 82 with rounded face 83 and a spring 84 loads the plunger 82. The block 18 carries a locking pin 85 slidable in a hole 86 to press against the side of the outer sleeve 40 of the tong assembly. The sleeve 40 has a cut away part 87, and a pin 88 movable in a slot 89 in the block 18.

With the sleeve 40 in the angular position shown in Fig. 5, the block 18 cannot be depressed in the body 11 due to the position of the pin 85. If now the sleeve 40 is rotated through 180° (i. e. a bottle in the jaws of the tongs is inverted in readiness for being depressed on to the hypodermic needle) the pin 85 is moved into the cut-away part 87 by the plunger 82 and the block 18 may be depressed.

In Fig. 6 the sleeve 40 is provided with a pin 88 movable in a slot 89 (as shown in Fig. 5), and the slot 89 terminates at the removable boss 49 which is cut-away (lines 90 show the edge of the cut-away part) to allow the sleeve 40 and pin 88 to rotate through 180°. This arrangement replaces the pin 48 and groove 46 design described above with reference to Fig. 2.

We claim:

1. Apparatus for injecting liquids into evacuated containers comprising a small capacity reservoir for the liquids, means for flushing liquids through the reservoir and thereafter filling it to a predetermined level, a hypodermic-type needle having its unpointed end open to the reservoir below said predetermined level and its pointed end exposed above said level, means clampingly supporting an evacuated, rubber-capped bottle of greater capacity than the reservoir and means for advancing and withdrawing the rubber-capped evacuated bottle supporting means on to and away from the needle so that the needle can penetrate the rubber cap to inject fluid from the reservoir into the bottle.

2. Apparatus as claimed in claim 1 wherein said reservoir comprises a tube having a closed end and the means for flushing liquids there through comprises an inlet pipe coupling with a vacuum lift, and an outlet pipe at said predetermined level.

3. Apparatus for injecting liquids into evacuated containers comprising a small capacity reservoir for the liquids, means for flushing liquids through the reservoir and thereafter filling it to a predetermined level, a hypodermic-type needle having its unpointed end open to the reservoir below said predetermined level and its pointed end exposed above said level, and means for advancing and withdrawing a rubber-capped evacuated bottle which comprises tongs slidably and axially rotatably mounted in a depressible block whereby depression of the block causes both tongs and bottle to be depressed so that the needle penetrates the cap of the bottle and sliding of the tongs permits movement of the bottle from a position above the needle to a position where it can be released into a shielded container, and rotation of the tongs serves to orientate the bottle.

4. Apparatus as claimed in claim 3 having an interlocking device which prevents depression of said block unless the tongs are in a position representative of the bottle in the tongs being inverted and a further interlocking device which prevents depression of said block unless the bottle is axially above the needle.

References Cited in the file of this patent

UNITED STATES PATENTS

| | | |
|---|---|---|
| 2,424,807 | Eckman | July 29, 1947 |
| 2,500,169 | Ellis | Mar. 14, 1950 |